Oct. 7, 1969 F. HODL 3,471,136

ROTARY CEMENT KILN LINING BRICK

Filed Dec. 19, 1967

INVENTOR

FRIEDRICH HODL

BY Kurt Kelman

AGENT

United States Patent Office 3,471,136

Patented Oct. 7, 1969

1

3,471,136

ROTARY CEMENT KILN LINING BRICK

Friedrich Hodl, Vienna, Austria, assignor to Veitscher Magnesitwerke-Actien-Gesellschaft, Vienna, Austria, a corporation of Austria Filed Dec. 19, 1967, Ser. No. 691,865
Claims priority, application Austria, Dec. 19, 1966, A 11,681/66
Int. Cl. F27d *1/04;* F23m *5/02*
U.S. Cl. 263—33 6 Claims

ABSTRACT OF THE DISCLOSURE

Refractory bricks for rotary cement kiln linings have radially extending grooves in their side faces, which are large enough so that the channels formed by such grooves in adjacent bricks in the lining remain open towards the hot inner face of the lining even when the bricks expand during operation of the kiln.

BACKGROUND AND SUMMARY OF THE INVENTION

The present invention relates to an improved refractory brick for rotary cement kiln linings, and to such linings.

It is well known that the life of rotary cement kiln linings is extended considerably when a deposit or coating of cement-clinker is formed and retained on the lining during operation of the kiln. Many proposals have, therefore, been made to favor the formation of such coatings, and, most importantly, to prevent the formed coatings from falling off the lining since this subjects the lining to a sudden temperature change which causes damage to the lining and shortens its useful life. Therefore, the stronger the layer of coatings adheres to the lining, the longer the same will remain operative.

It is the primary object of this invention to provide lining bricks which facilitate the formation of coatings during the operation of a rotary cement kiln and to retain the formed coatings on the lining.

This and other objects of the invention are accomplished with a brick having an inner face, an outer face and two side faces extending radially from the inner to the outer face. The brick is of a refractory material. The side faces of the brick define a plurality of grooves extending radially from the inner face. Aligned grooves in adjacent side faces of adjacent bricks in the lining form channels extending from the inner face, and the dimensions of the grooves are such that the channels remain open at the inner face when the refractory brick material expands on heating during operation of the kiln. Preferably, the channels are of circular cross section and the grooves extend only to a point spaced from the outer face which is cooler during the operation of the kiln than the inner face.

The open channels provide improved anchorage for the coatings forming on the kiln lining during operation and, according to an embodiment, the walls of the open channels may carry a substance to which the coatings adhere particularly well. It is important, however, to use a sufficiently thin layer of such a substance so that the channels do not become closed upon expansion of the refractory brick material.

BRIEF DESCRIPTION OF DRAWING

The above and other objects, advantages and features of the present invention will become more apparent when

Figure 1:
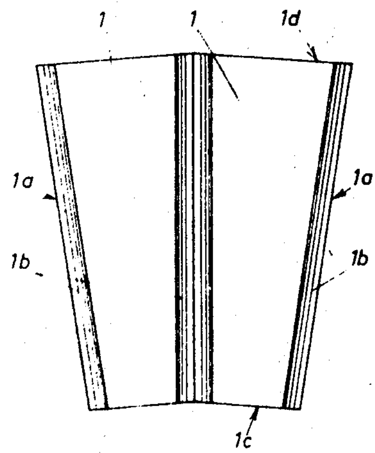
Figure 2:
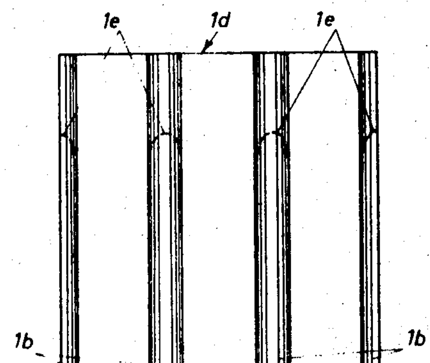

2 considered in the light of the following description of preferred embodiments thereof, taken in conjunction with the accompanying drawing wherein FIG. 1 is a view of a pair of juxtaposed bricks;

FIG. 2 is a side view of a brick; and

Figure 3:
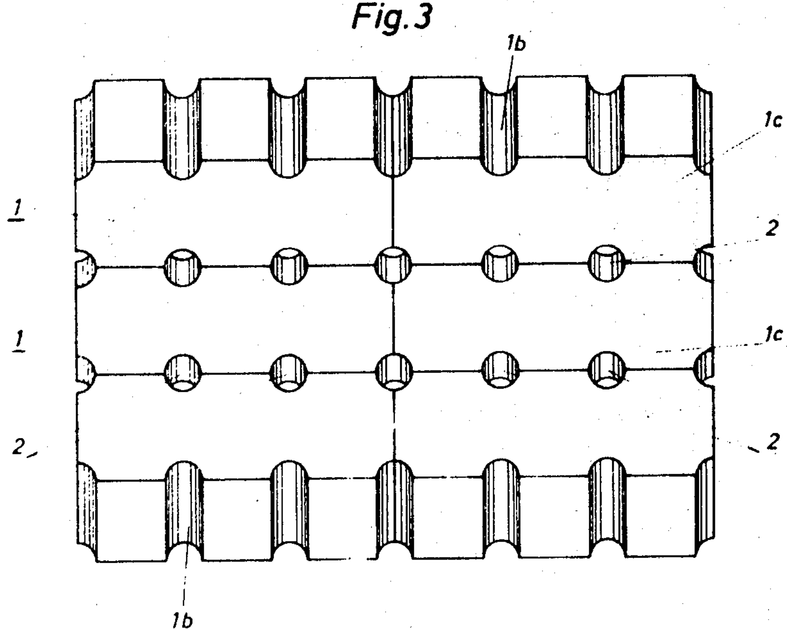

FIG. 3 shows a portion of the lining of a rotary cement kiln using the bricks of this invention.

DETAILED DESCRIPTION

As is seen in the drawing, each wedge-shaped brick 1 has two side faces 1*a*, 1*a*, an inner face 1*c*, which is hot during the kiln operation, and an outer face 1*d* which is cooler than face 1*c* during the kiln operation. A plurality of grooves 1*b* of semi-circular cross section are provided in each side face to form channels 2 of circular cross section extending radially from the hot face of the kiln lining, as seen in FIG. 3. While the grooves may extend from the inner to the outer face, it is sufficient if they extend to a point 1*e* spaced from the outer face, the open ends of the channels 2 at the inner face 1*c* being the essential feature of the invention.

When the kiln is operated to produce cement, coatings of cement-clinker are formed on the inner face of the lining, including the areas around the channel openings and penetrating into the open channels whereby the coatings are firmly anchored on the lining. This adherence will be further improved if the channel walls carry a substance which improves the adherence of the coatings. Such layers may be applied, for instance, in the form of a slurry by spraying, such as is conventional in repairing kiln linings. This slurry will penetrate into the open channels but the amounts thereof must be limited so that the coating will not close the channels upon heating of the bricks during operation of the kiln.

The bricks may consist of any suitable refractory material, such as fireclay or high-alumina material. A preferred material is magnesia which may contain small amounts up to about 20% by weight of chromit.

By the way of example a brick has a dimension of 75/68 x 180 x 187 mm., i.e. the vertical cross section forms a trapezoid, the parallel sides of which being 75 mm. and 68 mm. respectively and the height being 180 mm., while the length of the brick is 187 mm. The grooves have a radius of 13 mm.

I claim:

1. A brick for a rotary cement kiln lining, the brick being of a refractory material, and the brick having an inner face, an outer face and two side faces extending radially from the inner to the outer face, the inner face being hotter than the outer face when the brick is part of said lining and the kiln is in operation, and the side faces defining a plurality of grooves extending radially from the inner face, aligned ones of said grooves in adjacent side faces of adjacent ones of the bricks in the lining being adapted to form a channel extending from the inner face, and the dimensions of said grooves being sufficiently large so that the channels remain open at the inner face when the refractory brick material expands on heating during the operation of the kiln, and a clinker coating formed during continued kiln operation is firmly anchored in the channels of the lining.

2. The brick of claim 1, wherein the grooves are semi-circular to form channels of circular cross section.

3. The brick of claim 1, wherein the grooves extend to a point spaced from the outer face.

4. A rotary cement kiln lining comprising a plurality of juxtaposed bricks of a refractory material, each of the bricks having an inner face, an outer face and two side faces extending radially from the inner to the outer face, the inner face being hotter than the outer face when the kiln is in operation, and the side faces defining a plurality of grooves extending radially from the inner face, aligned ones of said grooves in adjacent side faces of adjacent ones of the bricks forming radial channels extending from the inner face, and the dimensions of said grooves being sufficiently large so that the radial channels remain open at the inner lining face when the refractory brick material expands on heating during operation of the kiln, and a clinker coating formed during continued kiln operation is firmly anchored in the channels of the lining.

5. The rotary cement kiln lining of claim 4, wherein the walls of the radial channels carry a substance to which the clinker coating in a rotary cement kiln adhere.

6. The rotary cement kiln lining of claim 4, wherein the grooves extend to a point spaced from the outer face.

References Cited

UNITED STATES PATENTS

| | | | |
|---|---|---|---|
| 1,772,350 | 8/1930 | Hobbs. | |
| 2,154,414 | 4/1939 | Teeters | 263—46 |
| 3,037,468 | 6/1962 | Snellman | 263—33 X |

FOREIGN PATENTS

| | | |
|---|---|---|
| 284,809 | 6/1915 | Germany. |

JOHN J. CAMBY, Primary Examiner

U.S. Cl. X.R.

110—1; 263—46